(12) United States Patent
Besch et al.

(10) Patent No.: US 9,928,268 B2
(45) Date of Patent: Mar. 27, 2018

(54) SYSTEM AND METHOD FOR VERIFYING THE CONTENTS OF FORMS RELATIVE TO A SEPARATE DATASET

(71) Applicants: Mark Besch, Ellisville, MO (US); John Hale, Altenburg, MO (US); Randall Broyles, Huntington Beach, CA (US)

(72) Inventors: Mark Besch, Ellisville, MO (US); John Hale, Altenburg, MO (US); Randall Broyles, Huntington Beach, CA (US)

( * ) Notice: Subject to any disclaimer, the term of this patent is extended or adjusted under 35 U.S.C. 154(b) by 293 days.

(21) Appl. No.: 14/796,292

(22) Filed: Jul. 10, 2015

(65) Prior Publication Data

US 2016/0034519 A1    Feb. 4, 2016

Related U.S. Application Data

(60) Provisional application No. 62/030,597, filed on Jul. 29, 2014.

(51) Int. Cl.
*G06F 17/00* (2006.01)
*G06F 17/30* (2006.01)
*G06F 17/24* (2006.01)

(52) U.S. Cl.
CPC ...... *G06F 17/30371* (2013.01); *G06F 17/243* (2013.01); *G06F 17/30864* (2013.01); *G06F 17/30876* (2013.01)

(58) Field of Classification Search
CPC ........ G06F 17/30563; G06F 17/30371; G06F 17/30303; G06F 17/30864; G06F 17/30876

USPC .... 707/690, 802, 602, 999.2; 705/31, 38, 39
See application file for complete search history.

(56) References Cited

U.S. PATENT DOCUMENTS

| | | | |
|---|---|---|---|
| 2002/0029194 A1* | 3/2002 | Lewis | G06Q 20/10 705/39 |
| 2004/0215554 A1* | 10/2004 | Kemper | G06Q 20/382 705/38 |
| 2009/0087077 A1* | 4/2009 | Nireki | G07D 7/12 382/135 |

(Continued)

FOREIGN PATENT DOCUMENTS

EP    2711830 A1    3/2014

*Primary Examiner* — Dung K Chau
(74) *Attorney, Agent, or Firm* — Shifrin Patent Law; Dan Shifrin

(57) ABSTRACT

A method is provided for verifying the contents of forms, comprising: receiving a dataset from a client, the dataset associated with a transaction; transmitting the dataset to a document vendor to be entered into and complete a transaction document form; receiving the completed transaction document form from the document vendor; generating a code uniquely associating the completed document with the dataset; printing the code onto the completed document; transmitting the completed document to the client; after the document has been executed, receiving the executed document from the client and separately the current dataset; using the code on the executed document, retrieving the stored transaction dataset; comparing the stored dataset with the dataset separately delivered as the current dataset; identifying all inconsistencies between the two datasets and storing these results as separate data; and transmitting a message to the client with the result of the comparison.

2 Claims, 6 Drawing Sheets

(56) References Cited

U.S. PATENT DOCUMENTS

| | | | |
|---|---|---|---|
| 2010/0161460 A1* | 6/2010 | Vroom | G06Q 40/123 |
| | | | 705/31 |
| 2010/0165377 A1 | 7/2010 | Has | |
| 2011/0246415 A1* | 10/2011 | Li | G06F 17/30592 |
| | | | 707/602 |
| 2012/0096005 A1* | 4/2012 | O'Connor | G06F 19/363 |
| | | | 707/741 |
| 2012/0226646 A1 | 9/2012 | Donoho et al. | |
| 2012/0250065 A1 | 10/2012 | Partridge et al. | |
| 2013/0018777 A1 | 1/2013 | Klein | |
| 2013/0246914 A1 | 9/2013 | Millefiorini et al. | |
| 2014/0039935 A1* | 2/2014 | Rivera | G06Q 40/08 |
| | | | 705/4 |
| 2014/0081858 A1 | 3/2014 | Block et al. | |
| 2015/0339769 A1* | 11/2015 | deOliveira | G06Q 40/025 |
| | | | 705/38 |

* cited by examiner

SYSTEM AND METHOD FOR VERIFYING THE CONTENTS OF FORMS RELATIVE TO A SEPARATE DATASET

RELATED APPLICATION DATA

The present application is related to commonly-assigned and U.S. Provisional Application Ser. No. 62/030,597, entitled "DOC/DATA KNOT," filed on Jul. 29, 2014, which application is incorporated herein by reference in its entirety.

TECHNICAL FIELD

The present invention relates generally to document management and, in particular, to verifying the accuracy of the contents of forms relative to a separate dataset.

BACKGROUND ART

In many transactional situations, standard forms are provided, filled in, signed, distributed, and stored. FIG. 1 illustrates an example of the general process for the purchase of, for example, real estate in which a document vendor is used to generate closing documents. In preparation for the loan closing, the lender sends the information to the document vendor (which may be a different section of the lender or an internal system) (step 100). After the document vendor inserts the information into the appropriate closing forms (step 102), the lender receives them back from the document vendor (step 104) and send them to the closing agent (step 106). At closing, the documents are signed and the closing agent delivers them to the lender (step 108). The lender reviews the documents for accuracy via a "post close review" (step 110). During the post-close review, the documents (physical or image) signed by the borrower(s) are compared with the current system of record data (typically the Loan Origination System ("LOS") to confirm that they match. If the signed documents are approved, the data and documents are eventually sent as separate files to a purchaser of the loan (step 112), which performs its own review of the documents (step 114) in a manner similar to that described with respect to step 110.

The lender must ensure that the data that is in its system of record, and that will be delivered separately to the purchaser of the loan, has remained consistent with the data that was used to create the documents that evidence the loan transaction. This check is performed to identify instances where either (1) the data was changed after creating the documents, which may be before or after the closing or (2) more than one document set was generated prior to closing the loan and there is a need to confirm that the correct document set was used to evidence the transaction.

SUMMARY OF THE INVENTION

A method is provided for verifying the contents of forms, comprising: receiving a dataset from a client, the dataset associated with a transaction; transmitting the dataset to a document vendor to be entered into and complete a transaction document form; receiving the completed transaction document form from the document vendor; generating a code uniquely associating the completed document with the dataset; applying the code onto the completed document; transmitting the completed document to the client; after the document has been executed, receiving the executed document from the client and separately the current dataset; using the code on the executed document, retrieving the stored transaction dataset; comparing the stored transaction dataset with the dataset separately delivered as the current (system of record) dataset; identifying all inconsistencies between the two datasets and storing these results as separate data; and transmitting a message to the client with the result of the comparison.

A system is also provided for verifying the contents of forms. The system comprises: a processor configured to execute instructions; a database configured to store data processed by the processor; and a memory configured to store instructions executable by the processor. The instructions comprise instructions for: receiving a dataset from a client, the dataset associated with a transaction; transmitting the dataset to a document vendor to be entered into and complete a transaction document form; receiving the completed transaction document form from the document vendor; generating a code uniquely associating with the dataset; applying the code onto the completed document; transmitting the completed document to the client; after the document has been executed, receiving the executed document from the client and separately the current dataset; using the code on the executed document, retrieving the stored transaction dataset used to generate the document; comparing the stored dataset with the dataset separately delivered as the current dataset; identifying all inconsistencies between the two datasets and storing these results as separate data; and transmitting a message to the client with the result of the comparison.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
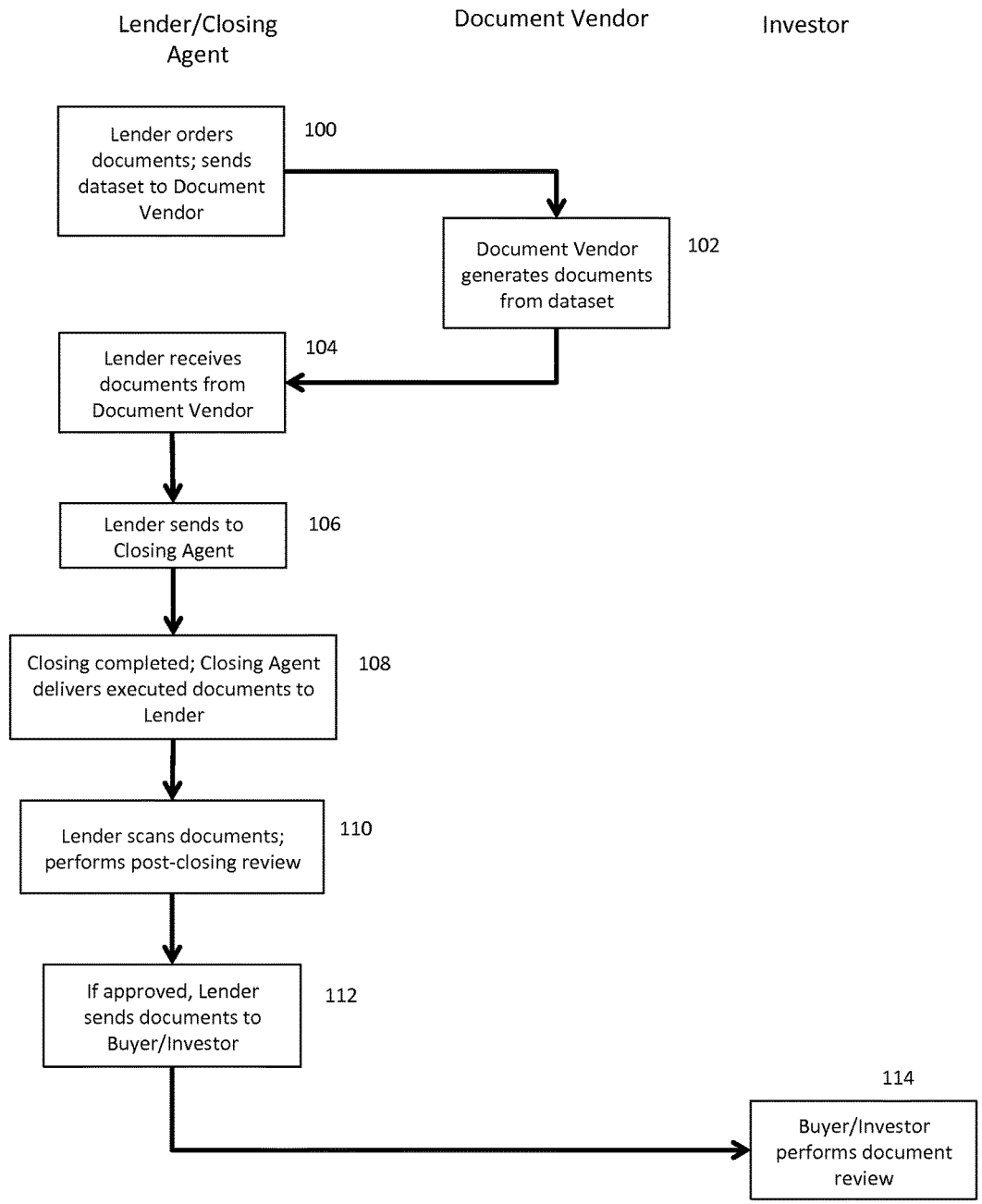
FIG. 1 is a process diagram of a typical prior art sequence of document management.
Figure 2A:
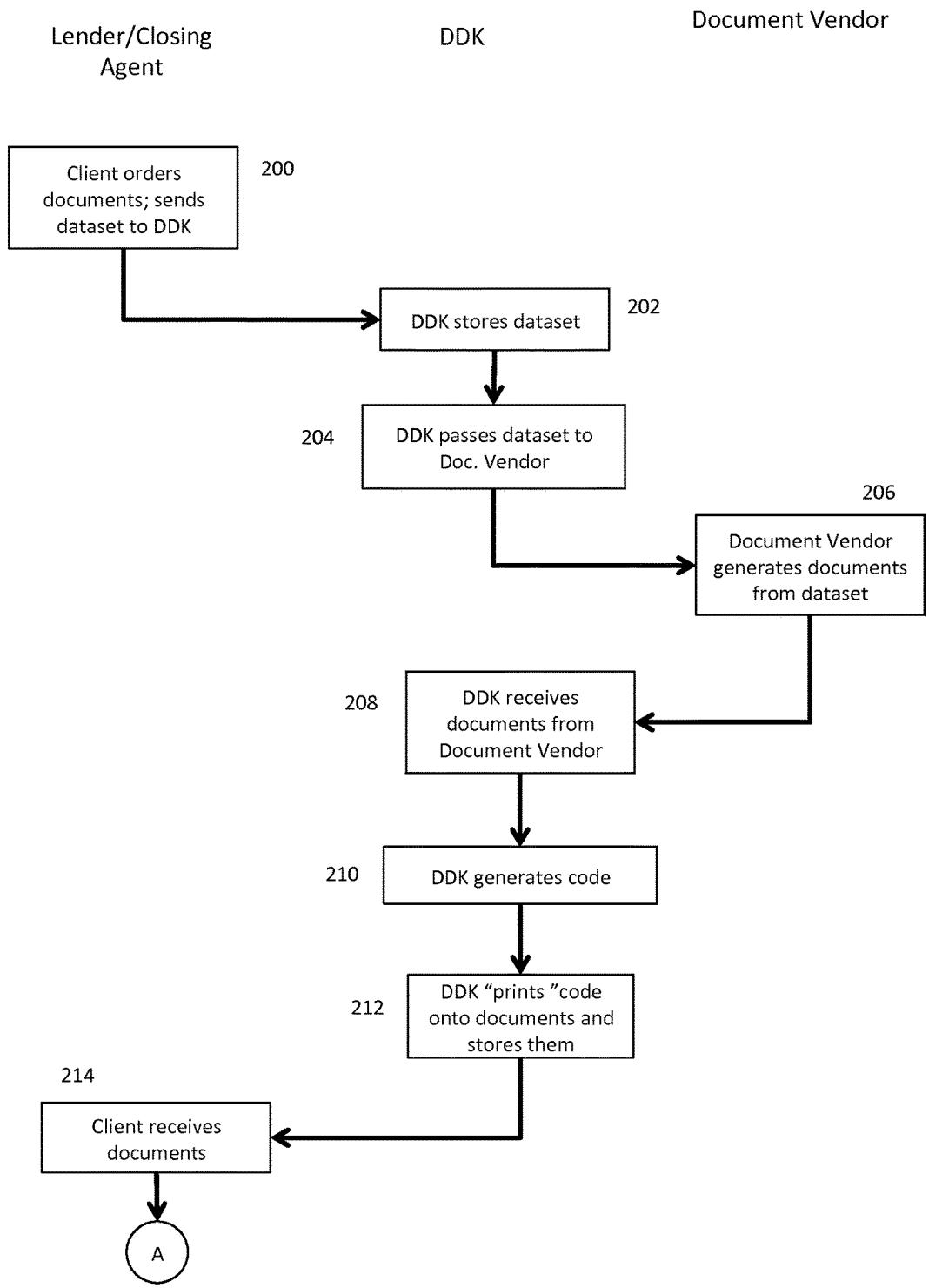
FIGS. 2A and 2B are a process diagram of an embodiment of a document management system of the present invention.
Figure 2B:
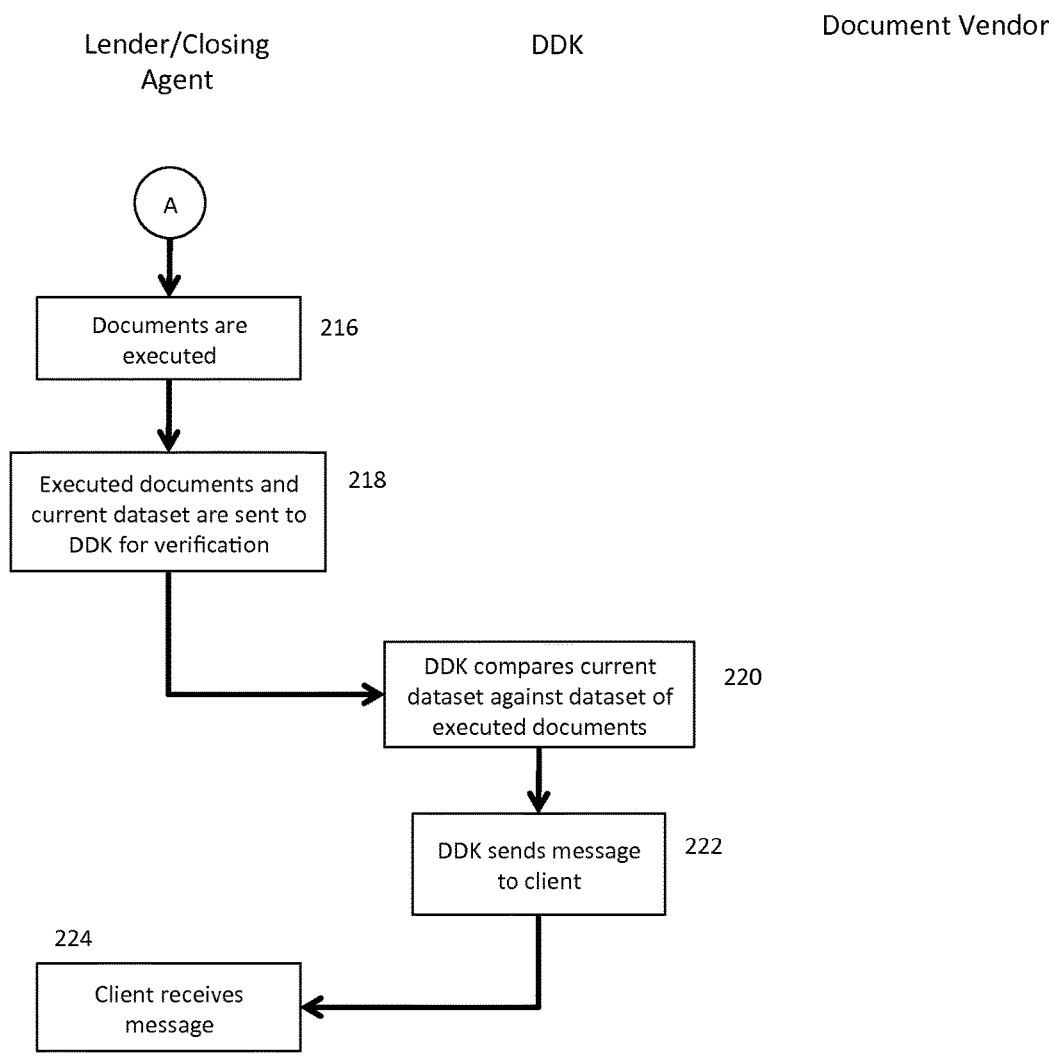
Figure 3:
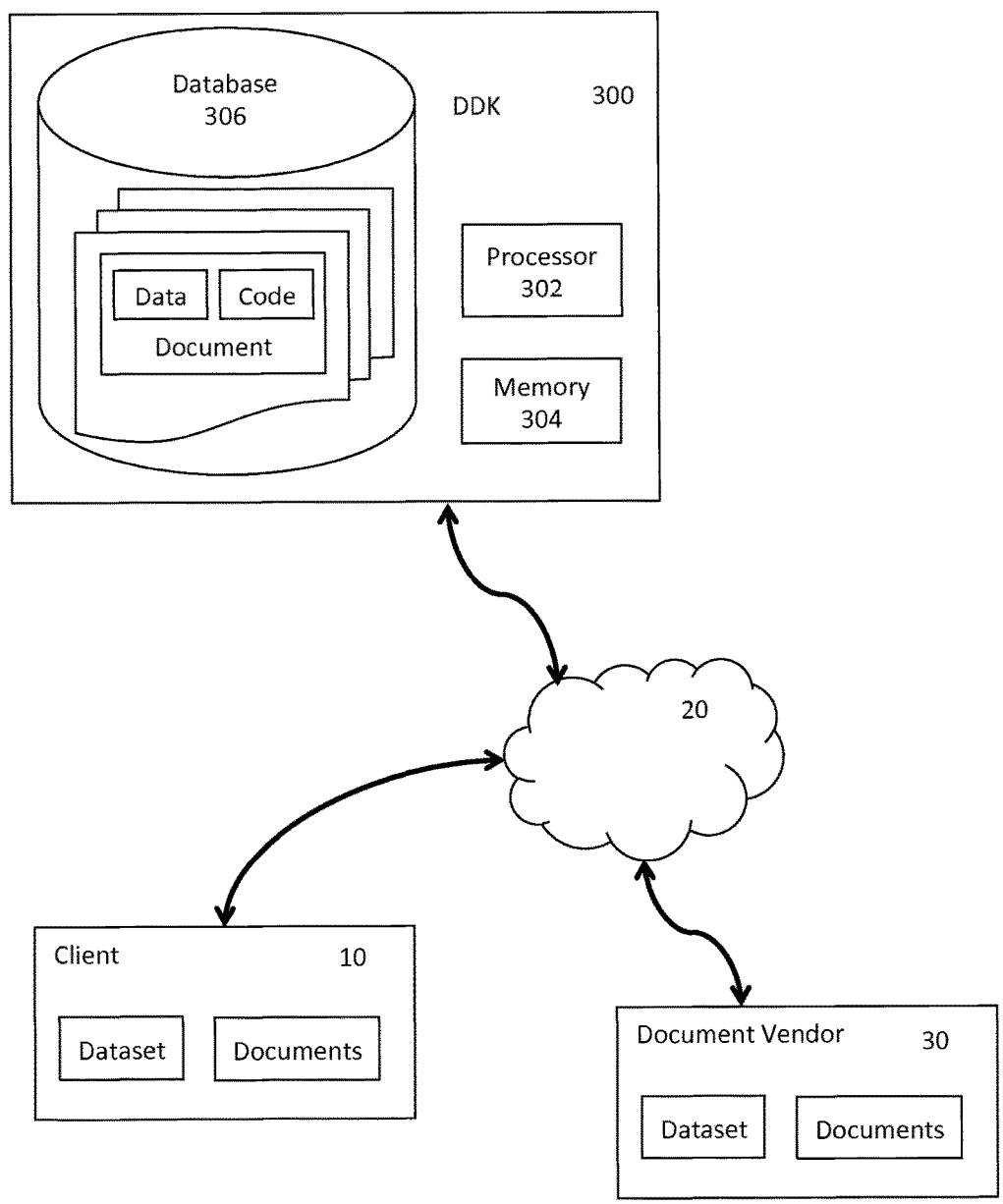
FIG. 3 is a block diagram of an embodiment of a system through which the process of FIGS. 2A, 2B may be implemented.

FIGS. 2A and 2B are a process diagram of an embodiment of a document management system of the present invention and FIG. 3 is a block diagram of an embodiment of a system through which the process of FIGS. 2A, 2B may be implemented. A client 10 desiring form documents orders the documents and, using the internet or other network 20, sends the information that is to be used to complete the forms ("dataset") to the document management service ("DDK") 300 (step 200). DDK 300 may include a processor 302, a memory 304 storing instructions executable by the processor 302, and a database 306. The dataset is stored in the database 306 (step 202) and passed on to a document vendor 30 (step 204) which inserts the dataset into the appropriate forms (step 206) and returns the completed documents to DDK 300. After receiving the documents from the vendor 30 (step 208), DDK 300 generates a code that identifies the client 10, the dataset, and the documents (step 210). The code is incorporated onto the documents, so as to be printed with the documents and stored as part of the documents in the database 306 (step 212). Thus, the code is a unique entry in the database 306 and is associated with, or linked to, the dataset used to generate the documents as well as to an electronic copy of the document. The code may thus be used to obtain the exact version of both data and documents from DDK. The code may be a quick response ("QR") code, a bar code, or any other appropriate code technique. The code may then be printed on the documents which are sent to the client 10 (step 214). Continuing on to FIG. 2B, the client 20 executes the documents or has them executed (step 216). The client sends uniquely both the executed documents and the current ("system of record") dataset for the values to be confirmed against DDK 300 (step 218). Using the code that was printed on the documents to retrieve the dataset used to create the documents, DDK 300 compares this data to the most recent dataset ("system of record" data) sent back to, or otherwise accessed by, DDK 300, and identifies inconsistencies (step 220). DDK 300 stores the results of each comparison request as data which is then available for creating and delivering reporting or other communication methods. In this embodiment DDK returns a report to the client 10 (step 222) with the results of the verification (identification of inconsistencies) and, if the report confirms the accuracy of the contents, the client 10 may store the report with its copies of the documents (step 224). If the report does not confirm the accuracy of the contents the client may resubmit the request with a different delivered dataset in order to match the DDK stored data for the document(s).

Figure 4A:
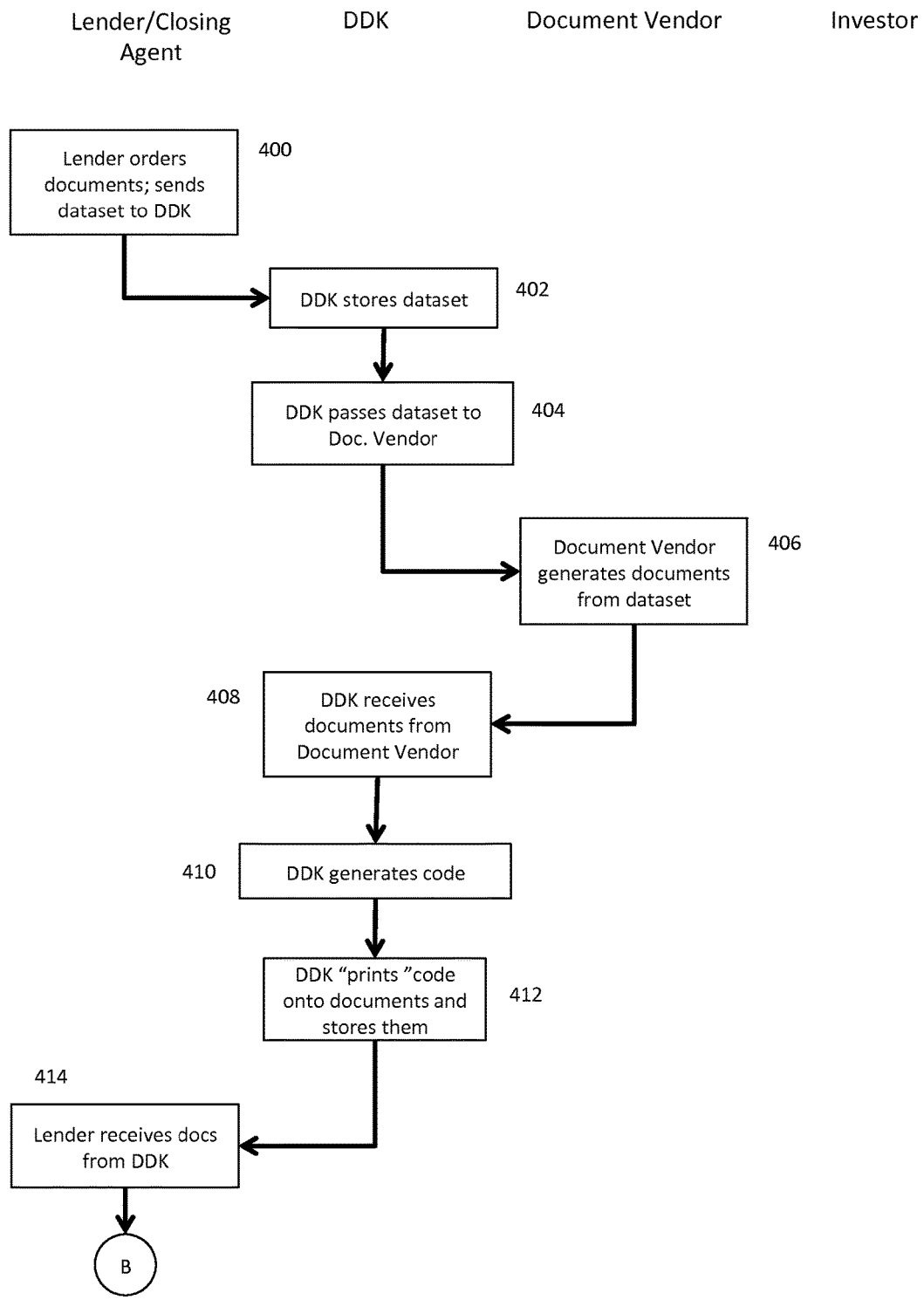
FIGS. 4A and 4B are a process diagram of another embodiment of a document management system of the present invention, which may also be implemented through the system of FIG. 3.
Figure 4B:
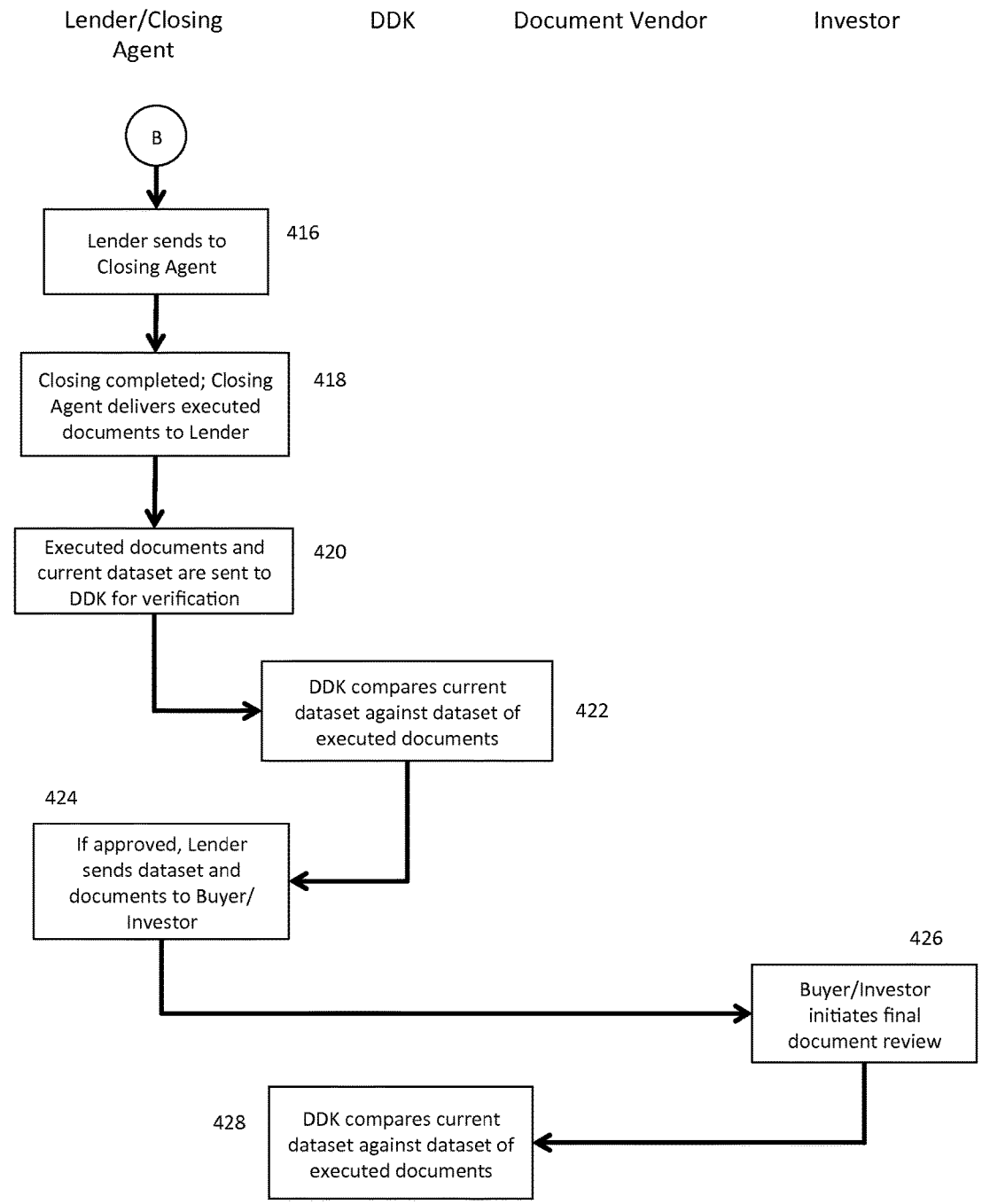

FIGS. 4A and 4B are a process diagram of the use of the document management system of the present invention to manage documents related to the closing of a loan transaction and which may also be implemented through the system of FIG. 3. A lender orders documents and send the dataset to DDK for processing (step 400). DDK stores the dataset (step 402) and sends the dataset and document request to the document vendor (step 404). The document vendor generates the documents from the requested forms (step 406) and sends the completed forms back to DDK (step 408). DDK generates code that identifies the client, the dataset, and the documents (step 410). As before, the code is incorporated onto the documents, so as to be printed with the documents and stored as part of the documents in the database (step 412). The documents are forwarded to the lender (step 414). Continuing on to FIG. 4B, the lender sends the documents to the closing agent (step 416). After the closing is completed, the closing agent delivers the executed documents back to the lender (step 418) to perform a post-closing review (step 420). During the post-close review, the documents (physical or image) signed by the borrower(s) are compared with the current system of record data (typically the Loan Origination System ("LOS") to confirm that they match. The lender sends the documents and the current dataset for the values to be confirmed to DDK where the code on the documents is scanned and the data used to create the documents are compared with the most recent dataset sent back to DDK to verify their accuracy (step 422). If the accuracy of the contents is verified, DDK sends a report to the lender which then sends the data and documents to a loan buyer or investor (step 424). If the report does not confirm the accuracy of the contents the client may resubmit the request with a different delivered, or otherwise accessed, dataset in order to match the DDK stored data for the document(s). The buyer/investor may request its own review (step 426) through DDK for a final verification of the data used to create the executed documents against the dataset that was separately delivered to them (step 428).

DDK always has the original dataset used to generate the documents and it is not updated. Thus, the original dataset is a trusted dataset that can be used for comparison purposes. Any appropriate user of the service can see if the dataset that they have for a given document or set of documents matches the original data that was used to create the document in an automated manner.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for verifying the contents of forms, comprising:
   receiving and storing a dataset from a client; the dataset associated with a transaction;
   transmitting the dataset to a document vendor to be entered into and complete a transaction document form;
   receiving the completed transaction document form from the document vendor;
   generating a code uniquely associating the completed transaction document form with the stored dataset;
   applying the code onto the completed transaction document form, whereby the code is printed on the completed transaction document form when the document is printed;
   transmitting the completed transaction document form to the client;
   after the completed transaction document form has been executed, receiving from the client the executed document and separately a current dataset;
   using the code printed on the executed document, retrieving the stored dataset used to generate the document;
   comparing the stored dataset with the separately received current dataset;
   identifying all inconsistencies between the stored dataset and the current dataset and storing these results as separate data; and
   transmitting a message to the client with the results.

2. A system for verifying the contents of forms, comprising:
   a processor configured to execute instructions;
   a database configured to store data processed by the processor; and
   a memory configured to store instructions; executable by the processor, for
      receiving and storing a dataset from a client, the dataset associated with a transaction;
      transmitting the dataset to a document vendor to be entered into and complete a transaction document form;

receiving the completed transaction document form from the document vendor;

generating a code uniquely associating the completed transaction document form with the stored dataset;

applying the code onto the completed transaction document form, whereby the code is printed on the completed transaction document form when the document is printed;

transmitting the completed transaction document form to the client;

after the completed transaction document form has been executed, receiving from the client the executed document and separately a current dataset;

using the code printed on the executed document, retrieving the stored dataset used to generate the document;

comparing the stored dataset with the received current dataset;

identifying all inconsistencies between the stored dataset and the current dataset and storing these results as separate data; and transmitting a message to the client with the results.

* * * * *